(12) United States Patent
Uchino

(10) Patent No.: US 10,667,149 B2
(45) Date of Patent: May 26, 2020

(54) CONTROL APPARATUS, TERMINAL DEVICE, AND WIRELESS BASE STATION

(71) Applicant: MITSUBISHI ELECTRIC CORPORATION, Tokyo (JP)

(72) Inventor: Daichi Uchino, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 29 days.

(21) Appl. No.: 16/060,619

(22) PCT Filed: Feb. 3, 2016

(86) PCT No.: PCT/JP2016/053229
§ 371 (c)(1),
(2) Date: Jun. 8, 2018

(87) PCT Pub. No.: WO2017/134771
PCT Pub. Date: Aug. 10, 2017

(65) Prior Publication Data
US 2018/0376352 A1    Dec. 27, 2018

(51) Int. Cl.
*H04W 56/00*    (2009.01)
*H04W 24/02*    (2009.01)
(Continued)

(52) U.S. Cl.
CPC .......... *H04W 24/02* (2013.01); *H04B 17/309* (2015.01); *H04W 16/28* (2013.01); *H04W 24/10* (2013.01); *H04W 16/18* (2013.01)

(58) Field of Classification Search
CPC ... H04W 24/02; H04W 17/309; H04W 16/28; H04W 24/10; H04W 16/18
(Continued)

(56) References Cited

U.S. PATENT DOCUMENTS

2005/0141468 A1* 6/2005 Kim .................. H04W 76/10
370/338
2007/0021151 A1    1/2007 Mori et al.
(Continued)

FOREIGN PATENT DOCUMENTS

EP    2 688 330 B1    6/2014
EP    2 624 614 B1    11/2015
(Continued)

OTHER PUBLICATIONS

"Next Generation Mobile Networks Informative List of SON Use Cases", NGMN, v1.23, Apr. 17, 2007, pp. 1-49.
(Continued)

*Primary Examiner* — Sai Ming Chan
(74) *Attorney, Agent, or Firm* — Birch, Stewart, Kolasch & Birch, LLP (57) ABSTRACT

A control apparatus for wireless communication system includes: a communication unit to obtain, from a base station, information indicating reception quality, at a terminal device, of a signal transmitted on a directional beam from the base station; and a processing unit to determine whether to remove a spot on the basis of the information obtained by the communication unit, the spot being an area irradiated with a directional beam from the base station. If the processing unit determines that the spot is to be removed, the communication unit sends an instruction to remove the spot to the base station or to a master base station of the base station.

18 Claims, 6 Drawing Sheets

(51) Int. Cl.
  *H04B 17/309* (2015.01)
  *H04W 16/28* (2009.01)
  *H04W 24/10* (2009.01)
  *H04W 16/18* (2009.01)
(58) Field of Classification Search
  USPC .......................................................... 370/252
  See application file for complete search history.

(56) References Cited

U.S. PATENT DOCUMENTS

| | | | | |
|---|---|---|---|---|
| 2008/0004028 | A1* | 1/2008 | Vincent | H04W 16/00 455/446 |
| 2012/0329448 | A1* | 12/2012 | Lim | H04W 92/20 455/422.1 |
| 2013/0170362 | A1 | 7/2013 | Futaki et al. | |
| 2015/0189568 | A1 | 7/2015 | Stanze et al. | |

FOREIGN PATENT DOCUMENTS

| | | |
|---|---|---|
| JP | 2015-532026 A | 11/2015 |
| JP | 5862569 B2 | 2/2016 |
| WO | WO 2012/043307 A1 | 4/2012 |

OTHER PUBLICATIONS

3GPP TR 36.902 V9.3.1 (Mar. 2011) Technical Report; 3rd Generation Partnership Project; Technical Specification Group Radio Access Network; Evolved Universal Terrestrial Radio Access Network (E-UTRAN); Self-configuring and self-optimizing network (SON) use cases and solutions (Release 9), 2011, pp. 1-21.

3GPP TS 36.300 V13.1.0 (Sep. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 2015, pp. 1-254.

Office Action issued in Japanese Patent Application No. 2016-538818, dated Aug. 25, 2016.

Cheng, M.; Fang, X.; Luo, W.; "Beamforming and positioning-assisted handover scheme for long-term evolution system in high-speed railway"; M. Cheng et al., IET Commun. 2012, vol. 6, Iss. 15, pp. 2335-2340.

Office Action issued in German Application No. 11 2016 006 138.2 dated Aug. 27, 2018.

* cited by examiner

| TERMINAL DEVICE LOCATION | | MEASUREMENT TIME |
|---|---|---|
| BASE STATION ID: 301 | SPOT ID: 318 | RECEPTION SENSITIVITY LEVEL: -50 dBm |
| BASE STATION ID: 315 | SPOT ID: 320 | RECEPTION SENSITIVITY LEVEL: -55 dBm |
| BASE STATION ID: 301 | SPOT ID: 313 | RECEPTION SENSITIVITY LEVEL: -78 dBm |
| BASE STATION ID: 301 | SPOT ID: 323 | RECEPTION SENSITIVITY LEVEL: -81 dBm |

CONTROL APPARATUS, TERMINAL DEVICE, AND WIRELESS BASE STATION

FIELD

The present invention relates to a control apparatus, a terminal device, and a wireless base station for a wireless communication system that provides communication using beamforming technology.

BACKGROUND

A Long-Term Evolution (LTE) system is standardized by Third Generation Partnership Project (3GPP) as a global standard wireless communication technology. 3GPP and Next Generation Mobile Networks (NGMN) have discussed self-organizing network (SON) aimed at reduction in operational cost of operators and at automatic network optimization in an LTE system. SON features are classified into four categories: planning, development, optimization, and maintenance (Non Patent Literature 1, 2, and 3). By applying SON features for efficient operation, construction, and planning of a network, such as wireless communication parameter optimization, network parameter optimization, and addition of a neighbor cell list, network stability is expected to improve.

In particular, implementation of self-configuration process and self-optimization process by automating tasks that have conventionally been done manually by operators can minimize the network operation cost. A self-configuration process is defined as a process to automatically obtain basic parameters necessary for system operation and to perform configuration when a base station (evolved Node B (eNB)) is newly installed. This self-configuration process is considered as a process that is mainly performed before the base station transitions to an operational state.

A self-optimization process is defined as a process to perform automatic network adjustment on the basis of statistical data from a terminal user equipment (UE) and/or the base station. This self-optimization process is considered as a process that is initiated after a radio frequency (RF) device starts up and is performed when the base station is in an operational state. Examples of parameter processed by a self-optimization process include the amount of transmitted power, the antenna tile angle of the wireless base station, and neighbor cell information. To achieve the object as described above, the self-optimization process appropriately modifies one or multiple of these wireless communication parameters in the wireless base station and/or in an operational management server (operation, administration, and maintenance (OAM) server or SON server).

Figure 11:
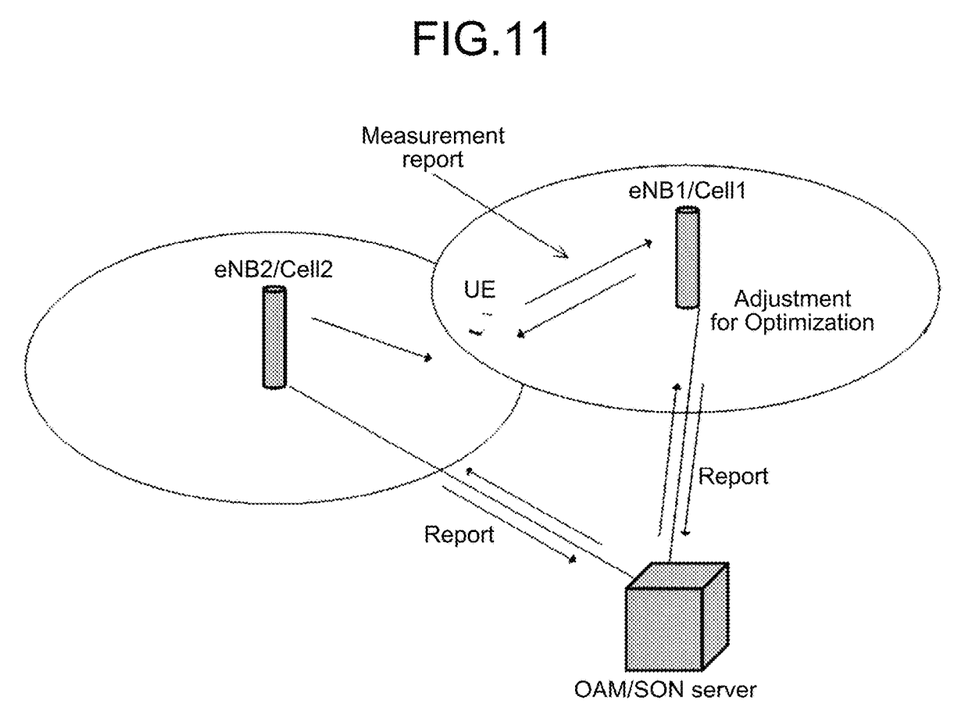
FIG. 11 is a diagram for explaining a technology relating to optimization of coverage over two macro-cells in conventional technology.

Technology relating to coverage optimization will be described below with reference to Patent Literature 1. FIG. 11 is a diagram for explaining a technology relating to optimization of coverage over two macro-cells. It is assumed in FIG. 11 that base stations (eNB1, eNB2) in macro-cells are connected to an operational management server (OAM/SON server) and that a certain UE resides in a macro-cell (Cell1) and is in communication with the base station 1 (eNB1).

The base station eNB1 instructs the UE to measure reception quality of the downlink reference signal (known signal) from the base station eNB1 and reception quality of the downlink reference signal from a base station eNB (e.g., the base station 2 (eNB2)) in a near cell, and to provide a report if a predetermined specific condition is satisfied. On the basis of the instruction from the base station eNB1, the UE measures reception quality of the downlink reference signal, and then reports the measurement result of the reception quality of the downlink reference signal to the base station eNB1 (Measurement report). The base station eNB1 reports the measurement result received from the UE to the OAM/SON server (Report). In the example of FIG. 11, the base station eNB2 also similarly reports, to the OAM/SON server, the measurement result received from a UE managed by the base station eNB2. After reception of the measurement result reports from the base stations eNB1 and eNB2, the OAM/SON server instructs the base stations eNB1 and eNB2 to adjust wireless communication parameters and the like for coverage optimization. (Adjustment for Optimization). For example, the base stations eNB1 and eNB2 each make adjustments to the amount of transmitted power and/or to the antenna tile angle of the cell of the base station to perform coverage optimization on the basis of the instruction from the OAM/SON server to adjust wireless communication parameters etc. for wireless coverage optimization.

CITATION LIST

Patent Literature

Patent Literature 1: Japanese Patent Application No. 2012-536356.

Non Patent Literature

Non Patent Literature 1: 3GPP TS 36.300 v13.1.0
Non Patent Literature 2: 3GPP TR 36.902 v9.3.1
Non Patent Literature 3: NGMN Informative List of SON Use Cases v1.23.

SUMMARY

Technical Problem

In conventional technology, coverage optimization of a cell of a base station is performed by adjustment to the amount of transmitted power and/or to the antenna tile angle. However, in a fifth-generation mobile communication system (hereinafter referred to as 5G), which is expected to become a global standard next generation wireless communication technology, SON features are required not only in a base station having a dipole antenna configuration or in a base station having a collinear antenna configuration, but also in a base station having an array antenna configuration.

A base station having an array antenna configuration has an antenna configuration in which the phases of the respective elements in the array antenna are changed to generate a highly directional antenna characteristic, thereby enabling a beamforming process to be performed on a terminal device. Use of such a base station forms a virtual cell (spot) by a ground surface area irradiated with a beam, and multiple ones of such spot form a coverage area. Therefore, a base station having an array antenna configuration is required to provide coverage optimization in smaller virtual cell units than the units of when coverage change is made by adjustment to the amount of transmitted power, the antenna tile angle, and/or the like. However, the conventional technology that optimizes coverage by adjustment to the amount of transmitted power and/or the antenna tile angle is disadvantageous in failing to provide such coverage optimization of each virtual cell.

The present invention has been made in view of the foregoing problem, and it is an object of the present invention to provide a control apparatus for wireless communication system, capable of providing coverage optimization to a base station having an array antenna configuration or other similar antenna configurations.

Solution to Problem

A control apparatus for wireless communication system according to an aspect of the present invention includes: a communication unit to obtain, from a first base station, information indicating reception quality, at a terminal device, of a signal transmitted on a directional beam from the first base station; and a processing unit to determine whether to remove a first spot on a basis of the information obtained by the communication unit, the first spot being an area irradiated with a directional beam from the first base station. If the processing unit determines that the first spot is to be removed, the communication unit sends an instruction to remove the first spot to the first base station or to a master base station of the first base station.

Advantageous Effects of Invention

A communication apparatus according to the present invention can determine whether to offer a service or not for each directional beam from the first base station, and can thus perform coverage optimization on a base station having an array antenna configuration or other similar antenna configurations.

DESCRIPTION OF EMBODIMENTS

First Embodiment

A control apparatus, a terminal device, and a wireless base station for a wireless communication system according to an embodiment of the present invention will be described below on the basis of the drawings. Note that this embodiment is not intended to limit the invention.

Figure 1:
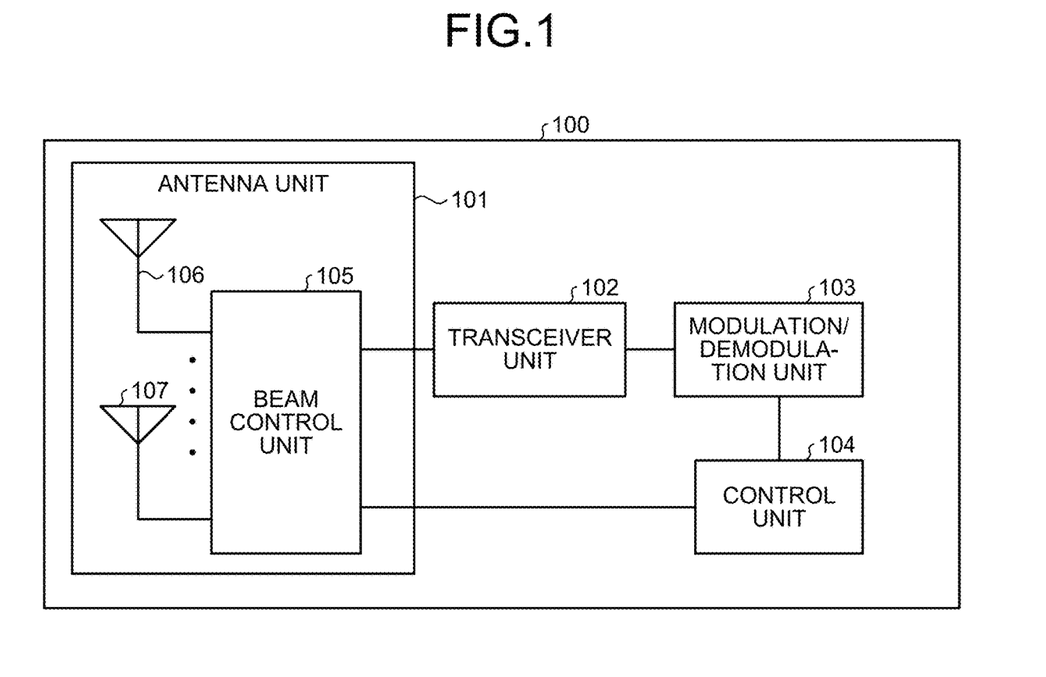
FIG. 1 is a diagram illustrating an exemplary configuration of a base station 100, which is a communication apparatus according to a first embodiment.

FIG. 1 is a diagram illustrating an exemplary configuration of a base station that is a communication apparatus according to the present invention. A base station 100 illustrated in FIG. 1 constitutes a wireless communication system together with a terminal device described later herein, and transmits and receives data to and from the terminal device using a beam formed by beamforming.

The base station 100 includes an antenna unit 101, a transceiver unit 102, a modulation/demodulation unit 103, and a control unit 104. The antenna unit 101 includes a beam control unit 105 and multiple antennas 106.

In the base station 100, the control unit 104 collects, from a terminal device within the service area covered by the base station 100, information on reception quality when signals are transmitted using the respective multiple beams, and determines, on the basis of the information collected, the beam to use for communication with the terminal device. The present embodiment assumes that the reception sensitivity level of a signal is used as the information on the reception quality collected by the control unit 104 as described later herein, but the information on the reception quality collected is not limited thereto.

The modulation/demodulation unit 103 modulates a control signal or data that is input from the control unit 104 and is to be transmitted to the terminal device, and demodulates a signal that is received from the terminal device and is input from the transceiver unit 102. The transceiver unit 102 performs a transmission process in which a digital signal input from the modulation/demodulation unit 103 is converted into an analog signal and the analog signal is then up-converted to a radio frequency signal (hereinafter referred to as wireless signal), and also performs a reception process in which a wireless signal received from the terminal device and input from the antenna unit 101 is down-converted to a baseband signal and the analog baseband signal is then converted into a digital signal.

The antenna unit 101 is used to transmit and receive wireless signals to and from the terminal device and to transmit and receive control information. The antenna unit 101 is also used in communication to transmit and receive data to and from other terminal devices. The beam control unit 105 uses a part or all of the multiple antennas 106 to form one or more beams on the basis of an instruction from the control unit 104. The beam control unit 105 selects and controls a directional beam through antenna selection or antenna adjustment. The beam control unit 105 is, for example, an electronic circuit configured to include an amplifier, a phase shifter, and the like. The beam control unit 105 distributes signals input from the transceiver unit 102 to multiple antennas 107, and multiplexes signals received by the antennas 107 and outputs the multiplexed signal to the transceiver unit 102. Note that the modulation/demodulation unit 103 may additionally perform an encoding process on a signal to be transmitted to the terminal device and perform a decoding process on a signal received from the terminal device. Data to be transmitted to the terminal device has been described as being input to the modulation/demodulation unit 103 via the control unit 104, but may be input to the modulation/demodulation unit 103 without intervention by the control unit 104.

Note that the transceiver unit 102, the modulation/demodulation unit 103, the control unit 104, and the beam control unit 105 constitute a unit for transmitting/receiving a signal for measurement. In addition, the control unit 104 also serves as a beam determination unit.

For simplicity of illustration, the description hereinafter refers to the service area covered by the base station 100 as "service area of the base station 100".

Figure 2:
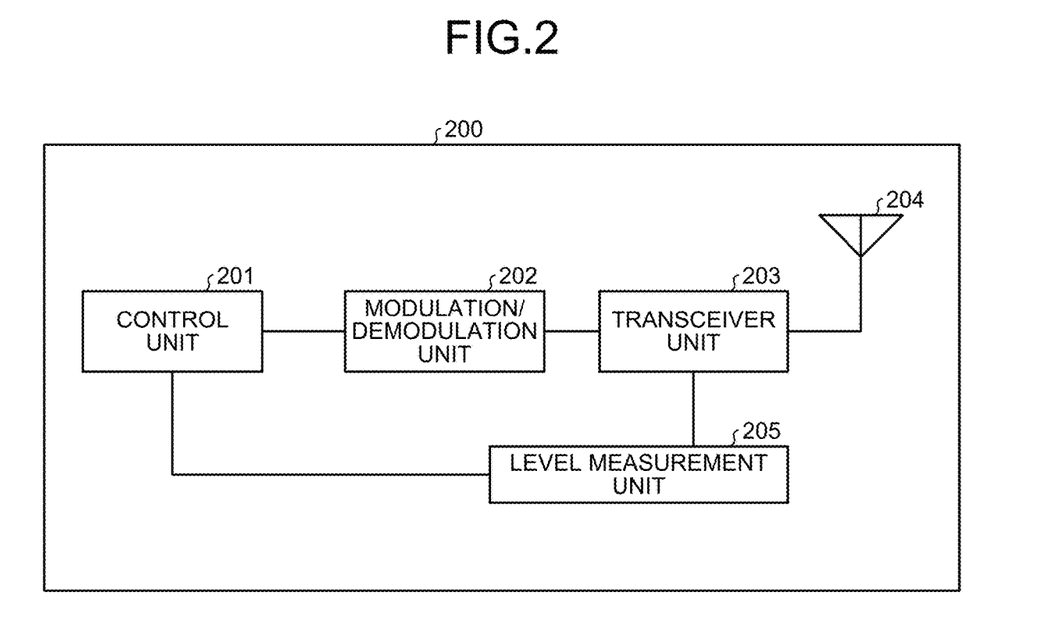
FIG. 2 is a diagram illustrating an exemplary configuration of a terminal device constituting a wireless communication system according to the first embodiment.

FIG. 2 is a diagram illustrating an exemplary configuration of a terminal device that constitutes, together with the base station 100, the wireless communication system. A terminal device 200 illustrated in FIG. 2 includes a control unit 201, a modulation/demodulation unit 202, a transceiver unit 203, an antenna 204, and a level measurement unit 205.

In the terminal device 200, the antenna 204 transmits and receives wireless signals to and from the base station 100 illustrated in FIG. 1. The transceiver unit 203 converts a digital signal input from the modulation/demodulation unit 202 into an analog signal and then up-converts the analog signal to a wireless signal, and also down-converts a wireless signal that is received from the base station 100 and is input from the antenna 204 to a baseband signal and then converts the analog baseband signal into a digital signal. The modulation/demodulation unit 202 modulates control information or data that is input from the control unit 201 and is to be transmitted to the base station 100 and demodulates a signal that is received from the base station 100 and is input from the transceiver unit 203. On the basis of an instruction from the base station 100, the control unit 201 collects information required for determining a beam to be used by the base station 100 to communicate with the terminal device 200 and transmits the information to the base station 100. The level measurement unit 205 measures the received power level (hereinafter referred to as reception level) of the wireless signal received by the antenna 204.

Next, an operation of determining a beam to be used by the base station 100 to communicate with the terminal device 200 will be described. Briefly describing this operation, the base station 100 uses multiple beams to transmit signals in the entire service area covered by the base station 100 and causes the terminal device 200 to measure the reception levels of the signals transmitted, as the reception quality. After completion of the measurement of reception levels of the signals received from the base station 100, the terminal device 200 provides the measurement results to the base station 100. The base station 100 then determines a beam to be used for communication with the terminal device 200 on the basis of the measurement results provided by the terminal device 200. Specifically, the base station 100 identifies the location of the terminal device 200 on the basis of the measurement results provided by the terminal device 200, that is, in which beam radiation direction the terminal device 200 is present. Then, the base station 100 determines to use the beam whose radiation direction matches the direction in which the terminal device 200 is present, or a beam whose radiation direction is close to the direction in which the terminal device 200 is present. Note that multiple terminal devices may be present in the service area of the base station 100, in which case the base station 100 determines, for each terminal device, the beam to be used for communication with the terminal device.

In this regard, the base station 100 may be limited in the number of beams that can be formed at a particular moment due to the size of the apparatus, the cost, the area of service area covered, and other reasons. Thus, the number of beams that can be simultaneously radiated onto a service area 311 illustrated in FIG. 3 may be limited.

Figure 3:
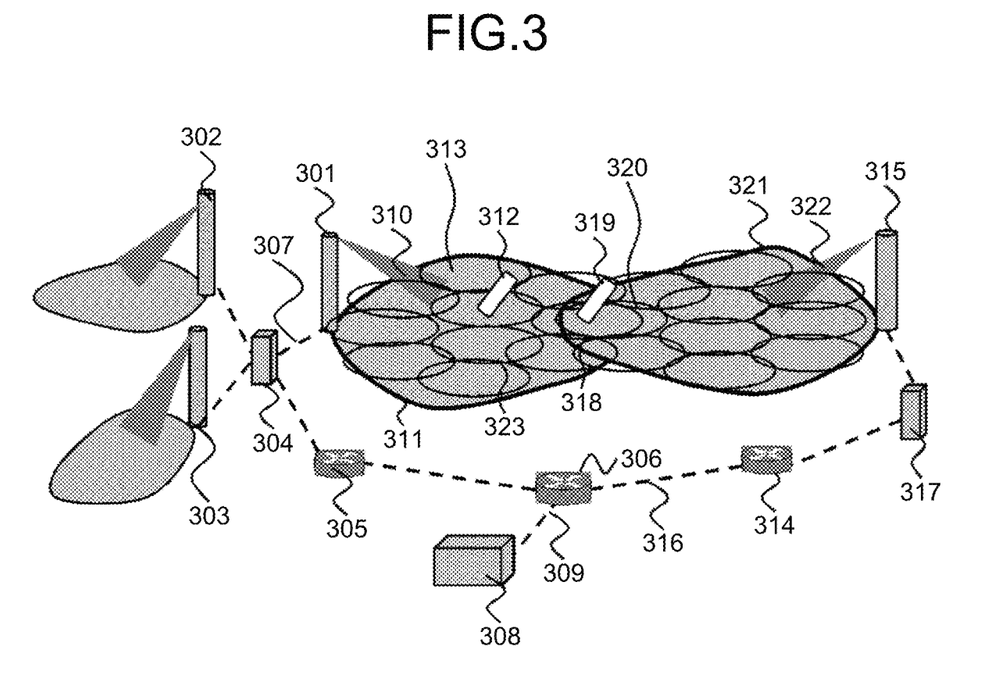
FIG. 3 is a diagram illustrating an exemplary configuration of the wireless communication system according to the first embodiment.

FIG. 3 is a diagram illustrating an exemplary configuration of a communication system according to the present invention. FIG. 3 illustrates ground surface areas irradiated with beams 310 and 322 generated by base stations 301 and 315 each having an array antenna configuration. An irradiated surface area, which is an irradiated region, forms a virtual cell (spot), and spots 318, 320, 313, 323, etc. form a coverage area. In a more detailed example, a particular base station having an array antenna configuration forms spots in a two-dimensional arrangement, and the area covered by that particular base station is divided into these two-dimensionally arran spots in a two-dimensional arrangement. However, the present embodiment is not limited to the configuration of this example.

The base stations 301 and 315 each having an array antenna configuration can perform coverage optimization in smaller virtual cell units than units of when coverage change is made using adjustment to the amount of transmitted power, the antenna tile angle, and/or the like. This requires a new method of wireless coverage optimization. Note that although the conventional technology performs coverage optimization prior to the beginning of operation, the present embodiment will describe a configuration capable of performing coverage optimization following a change in the wireless environment even after the beginning of operation.

The base station 301 illustrated in FIG. 3 includes the communication device of FIG. 1 as described above, and uses the beam 310 to transmit and receive data to and from a terminal device 312 that includes the communication device of FIG. 2 as described above. In the communication system of FIG. 3, a master base station 304 is connected to the base station 301 via an optical fiber cable, metal wire, wireless communication, or the like 307. The master base station 304 is not only connected to the base station 301, but also connected to a base station 303 and to a base station 302. Thus, the master base station 304 can also manage multiple base stations. The master base station 304 is connected to a router-or-relay device 305, and the router-or-relay device 305 is then connected to a control apparatus 308 through multiple router-or-relay devices 306. The router-or-relay device 305 is connected to the router-or-relay devices 306 and further to the control apparatus 308 via an optical fiber cable, metal wire, wireless communication, or the like 309, or the like. The control apparatus 308 is an apparatus that accumulates and/or records data obtained from the base station 301 etc. in a recording device, processes the data accumulated and/or recorded, and outputs an instruction to the base station 301 etc. and/or to the master base station 304. Details thereof will be described later herein.

As described above, the base station 301 can obtain information on the reception quality from the terminal device 312. This reception quality information includes unique number, symbol, and/or the like for identifying a base station (hereinafter referred to as base station ID), unique number, symbol, and/or the like for identifying a beam radiation location or a spot (hereinafter referred to as spot ID), reception quality obtained by measurement by the terminal device 312, location information 601 on the terminal device 312, and measurement time 602. The foregoing reception quality information is also referred to as feedback information or the like, and information including only a part of the foregoing elements is also referred to as such. Feedback information is periodically multicast from the terminal device 312 and the like to one or more base stations 301 and the like. This feedback information is then transmitted from the base station 301 through the master base station 304 to the control apparatus 308, where the feedback information is accumulated or recorded. The accumulated or recorded data is used as an index for determining the terminal device existing density in an area and for evaluating the construction of the service area.

Note that the router-or-relay devices 305 and 306 illustrated in FIG. 3 are merely an example, and the number of connected router-or-relay devices is not intended to limit the invention. In addition, the number of base stations managed by the master base station 304 is merely an example, and the number of connected base stations is not intended to limit the invention. The base station 301 determines one or more beam radiation locations within the service area 311, and forms, depending on directivity of the corresponding beam, the spot 313 in which the terminal device 312 can transmit and receive data to and from the base station 301. The service area 311 includes therein ten of such spot 313, but the configuration illustrated in FIG. 3 is merely an example, and the number of spots is not intended to limit the invention. In addition, the service area 311 of the base station 301 and a service area 321 of the base station 315 may overlap each other.

A situation will next be described in which the service area 311 of the base station 301 and the service area 321 of the base station 315 overlap each other. The base station 301 is managed by the master base station 304, while the base station 315 is managed by a master base station 317. The master base station 304 and the master base station 317 are connected to the control apparatus 308 through the router-or-relay device 305 and a router-or-relay device 314 using an optical fiber cable, metal wire, wireless communication, or the like 316 to form a network. As described above, the control apparatus 308 is an apparatus that accumulates and/or records the feedback information from a terminal device 319 in a recording device, processes the information accumulated and/or recorded, and outputs a control instruction to the base station 315 and/or to the master base station 317.

In FIG. 3, the spot 318 formed by the beam 310 from the base station 301 and the spot 320 formed by the beam 322 from the base station 315 in the service area 311 and the service area 321 overlap each other. Under such condition, the terminal device 319 present in both the spot 318 and the spot 320 undergoes a reduction in reception sensitivity level due to inter-beam interference if the beam 310 of the base station 301 and the beam 322 of the base station 315 are simultaneously emitted. The terminal device 319 reports, as the feedback information, the reduction in reception sensitivity level to the base station 301 to which the terminal device 319 is connected. Having the feedback information being reported, the base station 301 transmits the feedback information through the master base station 304 to the control apparatus 308. The control apparatus 308 accumulates and/or records the feedback information in a recording device. Note that, in the present embodiment, the base station 301 and the base station 315 may also be referred to as first base station and second base station, respectively; and moreover, the spot 318 and the spot 320 may also be referred to as first spot and second spot, respectively.

Figure 4:
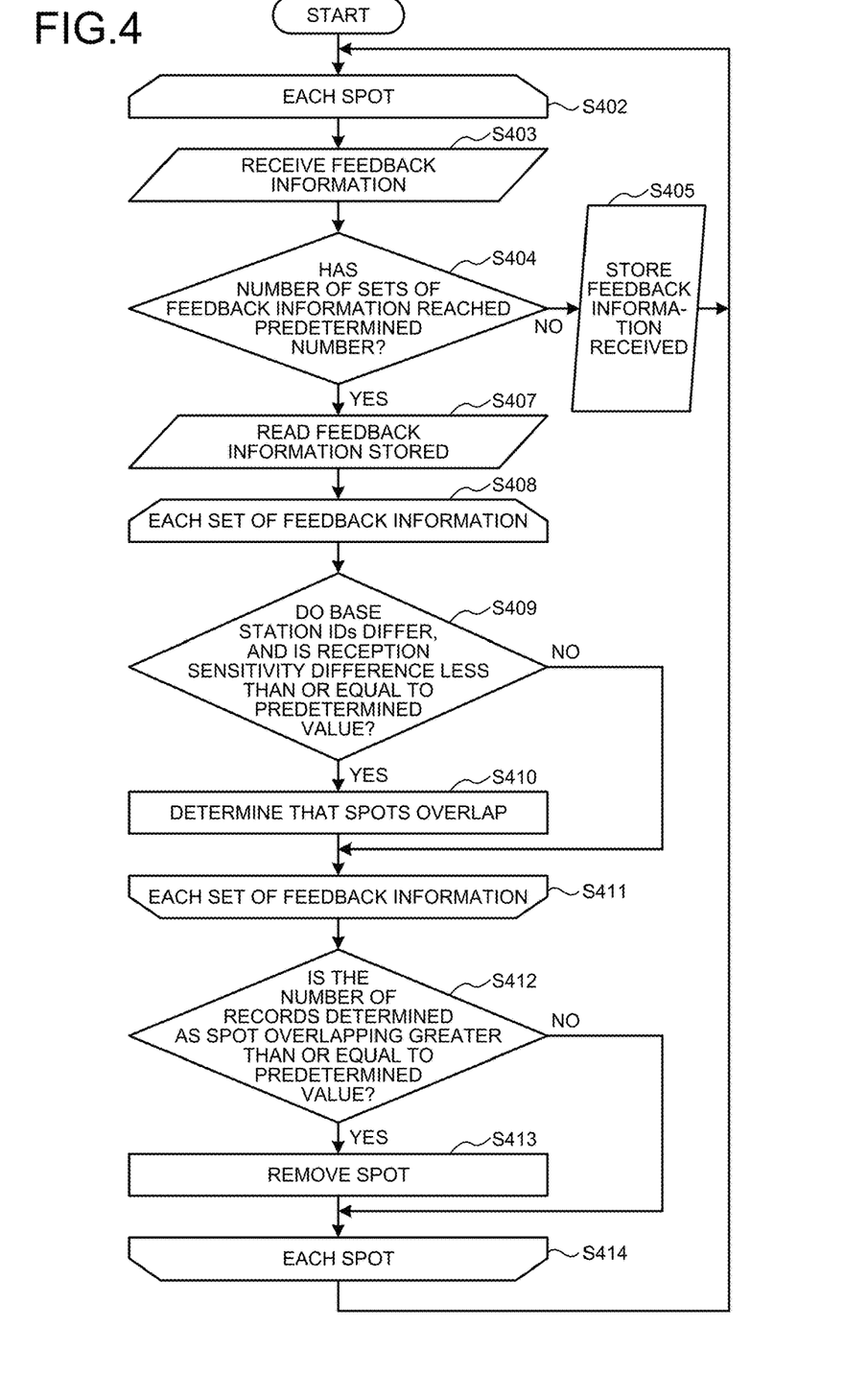
FIG. 4 is a flowchart illustrating a process performed in a control apparatus 308 according to the first embodiment.

The control apparatus 308 performs a process to make a determination about removal of a spot, illustrated in FIG. 4, in response to reception of the feedback information described above, and instructs the master base station 317 or the master base station 304, and/or the base station 315 or the base station 301 to remove the spot. On the basis of the instruction from the control apparatus 308, the master base station 317 or the master base station 304, and/or the base station 315 or the base station 301 removes the spot. The removal of a spot reduces the inter-beam interference on the terminal device 319. Note that the control apparatus 308 determines whether to remove the spot 318 in the service area 311 of the base station 301 or the spot 320 in the service area 321 of the base station 315, on the basis of a part or all of the numbers, the loads, the amounts of traffic, the scales, and the like of the base stations 301 and the base stations 315 respectively managed by the master base station 304 and the master base station 317. This determination may also be made on the basis of a part or all of the numbers, the amounts of traffic, the loads, the scales, and the like of the terminal devices connected to the base stations 301 and to the base stations 315.

Figure 5:
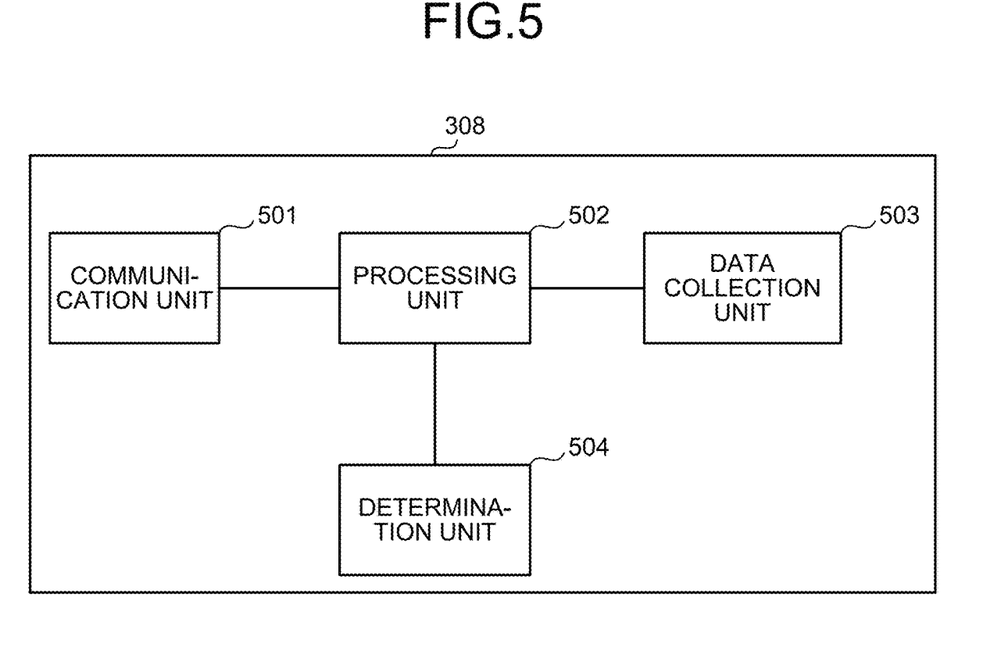
FIG. 5 is a diagram illustrating an exemplary apparatus configuration of the control apparatus 308 according to the first embodiment.

FIG. 5 is a diagram illustrating an exemplary apparatus configuration of the control apparatus 308 according to the present invention. The control apparatus 308 illustrated in FIG. 5 includes a communication unit 501, a processing unit 502, a data collection unit 503, and a determination unit 504.

The control apparatus 308 is connected with the optical fiber cable, metal wire, wireless communication, or the like 309 using the communication unit 501. The communication unit 501 obtains feedback information from the base station 301 through the master base station 304. The communication unit 501 that obtains the feedback information is connected to the processing unit 502, which performs the process of the flowchart of FIG. 4 described below. The processing unit 502 is connected to the data collection unit 503, which accumulates and/or records feedback information. The determination unit 504 connected to the processing unit 502 makes a determination about spot overlapping and counts the number of sets of feedback information as described below. The processing unit 502 determines whether to remove a spot or not on the basis of the information obtained by the communication unit 501.

Figure 6:
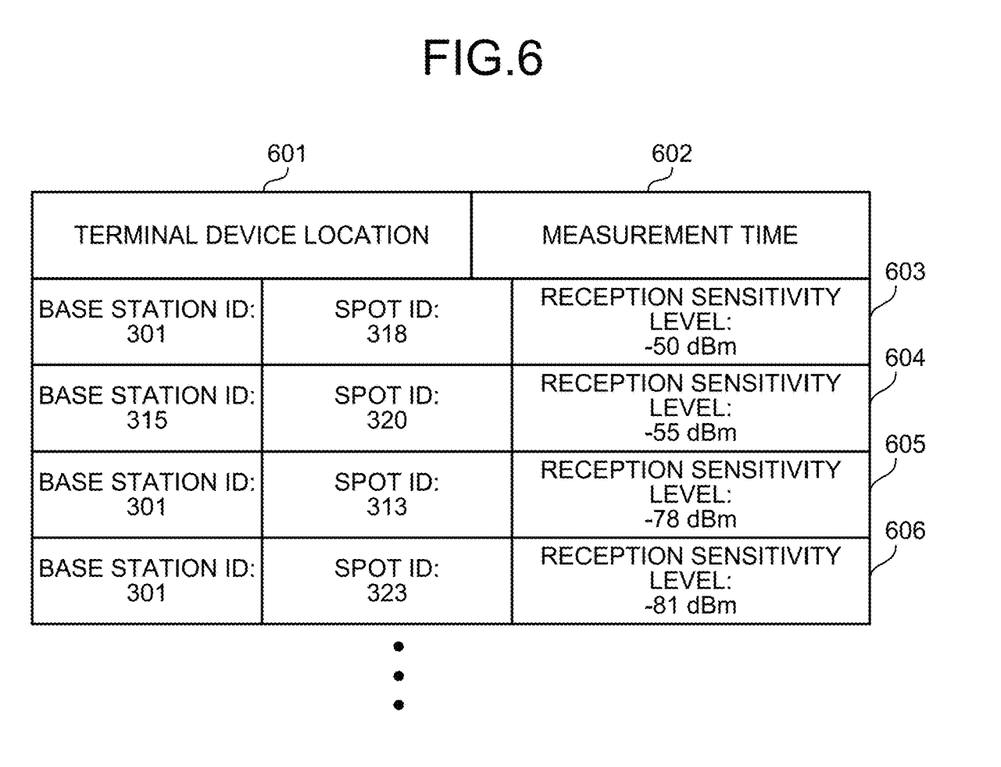
FIG. 6 is a chart illustrating a message format of feedback information from a terminal device 319 according to the first embodiment.

FIG. 4 is a flowchart for making a determination about removal of a spot in the processing unit 502 of the control apparatus 308. The control apparatus 308 processes feedback information sent from the master base station 304 or from the master base station 317 for each spot of the base station to which a terminal device is connected (step S402). When the control apparatus 308 receives feedback information (step S403), the control apparatus 308 counts the number of sets of feedback information obtained from a terminal device for each spot of the base station to which the terminal device is connected, and determines, for each spot, whether the number of sets of feedback information received by the control apparatus 308 has reached a predetermined number (step S404). If the predetermined number has not yet been reached, the control apparatus 308 stores the feedback information in a storage device or the like of the data collection unit 503 of FIG. 5 (step S405). If the number of sets of feedback information received by the control apparatus 308 has reached the predetermined number, the control apparatus 308 reads feedback information from the data collection unit 503 to perform step S409 together with the feedback information previously received by the control apparatus 308 and being stored in the storage device (step S407). The feedback information that is read includes all or a part of a base station ID, a spot ID, a reception sensitivity level, the location information 601, and the measurement time 602 of FIG. 6 described above, and one or more sets of such information are obtained at one time. FIG. 6 illustrates an exemplary message format of the feedback information listed in ascending order of the reception sensitivity level.

The feedback information of FIG. 6 is feedback information from the terminal device 319 illustrated in FIG. 3. The terminal device 319 is present in the service area 311 of the base station 301 and in the service area 321 of the base station 315, and is connected to the base station 301.

The base station ID: 301 and the base station ID: 315 of the feedback information of FIG. 6 respectively correspond to the base station 301 and to the base station 315 illustrated in FIG. 3. The spot ID: 318, the spot ID: 320, the spot ID: 313, and the spot ID: 323 of the feedback information of FIG. 6 respectively correspond to the spot 318, the spot 320, the spot 313, and the spot 323 illustrated in FIG. 3. This is an example in which the terminal device 319 simultaneously transmits four sets of base station IDs, spot IDs, reception sensitivity levels, terminal device locations, and measurement times to the base station 301 in connection with the content of the feedback information of FIG. 6. This feedback information corresponds to a measurement performed by the terminal device for a certain time period, and thus one or more sets of feedback information including a base station ID, a spot ID, and a reception sensitivity level are transmitted to the base station to which the terminal device is connected. Thus, in the example, four sets of feedback information 603 to 606 are transmitted. Step S409 of FIG. 4 will now be described in connection with FIG. 6, assuming that a predetermined value for the reception sensitivity level at step S409 is 5 dBm or less. Then, the feedback information 603 of FIG. 6 including the base station ID: 301, the spot ID: 318, and the reception sensitivity level: −50 dBm, and the feedback information 604 including the base station ID: 315, the spot ID: 320, and the reception sensitivity level: −55 dBm differ in the reception sensitivity level by 5 dBm, which is less than or equal to the predetermined value of the difference in the reception sensitivity level at step S409. Because of this and the difference in the base station ID, the control apparatus 308 determines that a spot overlapping condition applies (step S410). In contrast, the feedback information 605 including the base station ID: 301, the spot ID: 313, and the reception sensitivity level: −78 dBm, and the feedback information 606 including the base station ID: 301, the spot ID: 323, and the reception sensitivity level: −81 dBm differ in the reception sensitivity level by 3 dBm. However, the condition at step S409, that is, "the base station IDs differ, and the difference in the reception sensitivity level is less than or equal to a predetermined value" is not satisfied. Thus, the control apparatus 308 causes the process to proceed to step S411. The processing unit 502 of the control apparatus 308 performs foregoing steps S409 and S410 on the feedback information accumulated and/or recorded in the storage device of the data collection unit 503 for each applicable spot (steps S408 and S411). If the number of spot overlappings is greater than or equal to a predetermined threshold (step S412), the processing unit 502 of the control apparatus 308 determines that the spot is to be removed (step S413). If it is determined that the spot is to be removed, the communication unit 501 of the control apparatus 308 sends an instruction to remove the spot to the master base station 304, the master base station 317, or the like, and/or to the base station 301 or the base station 315; and the base station 301 or the base station 315 then removes the spot from the service area of the base station 301 or the base station 315 as needed (step S414). This operation is performed for each spot. Note that the values of the reception sensitivity level are merely by way of example, and are not intended to limit the invention. The term "reception sensitivity level" may refer to reference signal received power (RSRP), a received signal strength indicator (RSSI), or the like.

Figure 7:
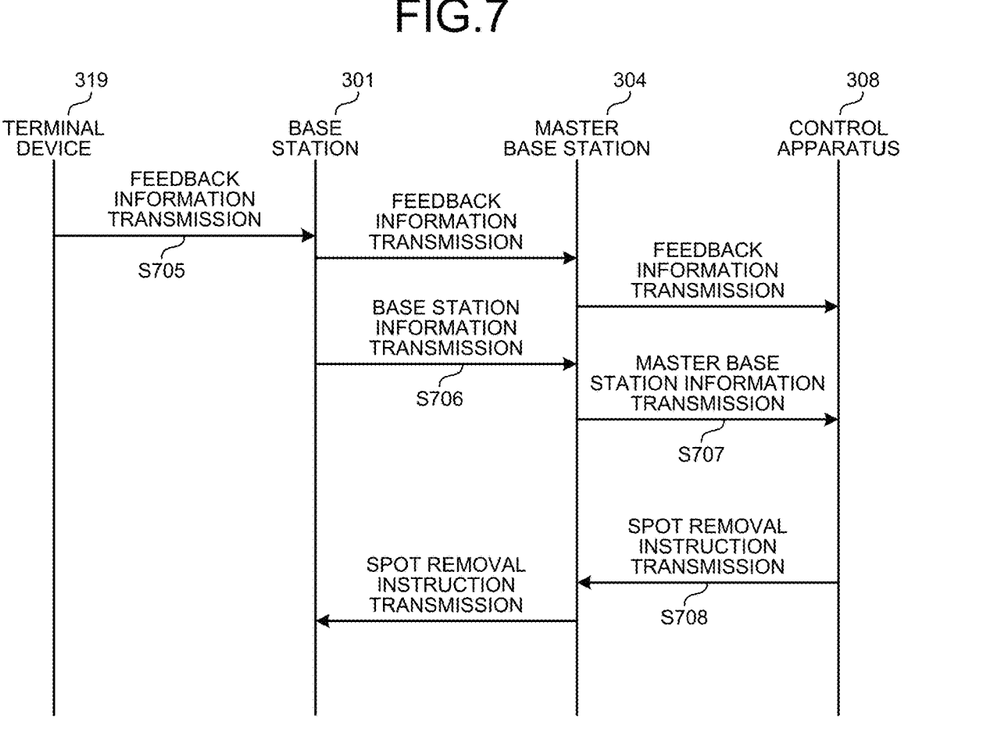
FIG. 7 is a diagram illustrating a sequence between the terminal device 319 and the control apparatus 308 according to the first embodiment.

FIG. 7 illustrates a message exchange sequence for feedback information and for base station information between the terminal device 319 and the control apparatus 308. The terminal device 319 periodically performs feedback information transmission S705 to the base station 301. The base station 301 periodically performs transmission of the feedback information received from the terminal device 319 to the master base station 304. The master base station 304 periodically performs transmission of the feedback information received from the base station 301 to the control apparatus 308. The control apparatus 308 performs the process illustrated in FIG. 4. In addition to this, the base station 301 performs base station information transmission S706 to the master base station 304. This information includes information such as the number of terminal devices managed by the base station, the load condition of the base station, the scale of the base station, and the number of connected terminal devices. The master base station 304 performs master base station information transmission S707 to the control apparatus 308. This information includes the content of the base station information transmission S706 and information such as the number of base stations managed by the master base station, the number of terminal devices managed by the master base station, and the scale of the master base station. The control apparatus 308 obtains this information using the communication unit 501, and the processing unit 502 of the control apparatus 308 may then determine, on the basis of this information obtained using the communication unit 501, to which master base station the base station from which the spot is to be removed is connected. In a case in which the processing unit 502 of the control apparatus 308 determines that the master base station 304 manages the base station from which the spot is to be removed, the communication unit 501 of the control apparatus 308 performs spot removal instruction transmission S708 to the master base station 304. The master base station 304 may send the spot removal instruction transmission S708 received from the control apparatus 308 to the base station 301.

The control apparatus 308 may determine the master base station corresponding to the base station that should remove the spot, on the basis of the number of base stations managed by the master base station, the number of terminal devices managed by the master base station, the scale of the master base station, the number of terminal devices managed by the base station that should remove the spot, the load condition of the base station, and/or the scale of the base station. In such case, the communication unit 501 of the control apparatus 308 obtains the information described above, such as the load of the base station 301 and the load of the base station 315; the number of the base stations 301 managed by the master base station 304 to which the base station 301 belongs and the number of base stations managed by the master base station 317 to which the base station 315 belongs; or the number of terminal devices managed by the master base station 304 to which the base station 301 belongs and the number of terminal devices managed by the master base station 317 to which the base station 315 belongs. Then, the processing unit 502 determines, on the basis of the information obtained by the communication unit 501, which of the spot 318 corresponding to the master base station 304 and the spot 320 corresponding to the master base station 317 is to be removed. A base station may promptly remove the spot, or may cancel the removal of the spot depending on the communication condition of a terminal device served by the base station.

This operation performed by the control apparatus 308 causes either the spot 318 of the base station 301 or the spot 319 of the base station 315 to be removed by the corresponding base station, thereby enabling inter-beam interference on the terminal device 319 to be reduced, and thus the reception quality of the terminal device 319 and/or the throughput to be improved. Note that an SON using conventional technology provides optimization of a coverage area on a per-cell basis, but even though the coverage area of a cell is increased or decreased by adjustment to the amount of transmitted power, the antenna tile angle, and/or the like, a process to remove the coverage area of a cell is not performed. In contrast, in the present embodiment, the operation of the control apparatus 308 enables either the spot 318 of the base station 301 or the spot 319 of the base station 315 to be removed.

Next, hardware for implementing the base station 100, the terminal device 200, and the control apparatus 308 will be described.

Figure 8:
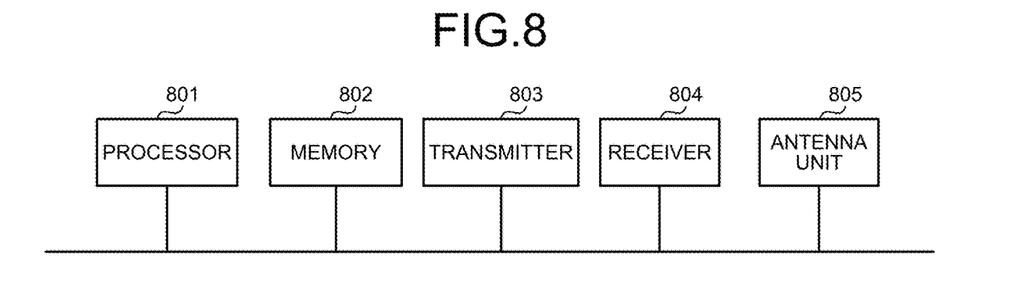
FIG. 8 is a diagram illustrating one example of hardware configuration for implementing the base station 100 and a terminal device 200 according to the first embodiment.
Figure 9:
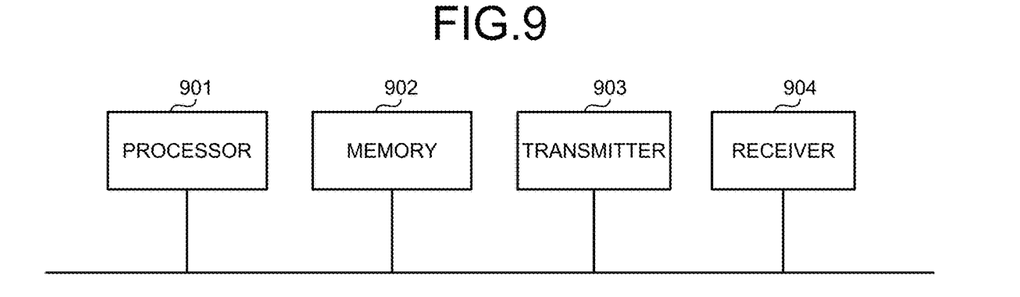
FIG. 9 is a diagram illustrating one example of hardware configuration for implementing the control apparatus 308 according to the first embodiment.

FIG. 8 is a diagram illustrating one example of hardware configuration for implementing the base station 100 and the terminal device 200. The base station 100 and the terminal device 200 are each implemented by, for example, a processor 801, a memory 802, a transmitter 803, a receiver 804, and an antenna unit 805 illustrated in FIG. 8. In addition, FIG. 9 is a diagram illustrating one example of hardware configuration for implementing the control apparatus 308. The control apparatus 308 is implemented by, for example, a processor 901, a memory 902, a transmitter 903, and a receiver 904 illustrated in FIG. 9.

The processor 801 is a central processing unit (CPU; also referred to as processing unit, computing unit, microprocessor, microcomputer, processor, digital signal processor (DSP)), a system large scale integrated circuit (LSI), or the like. The memory 802 is a non-volatile or volatile semiconductor memory such as a random access memory (RAM), a read-only memory (ROM), a flash memory, an erasable programmable read-only memory (EPROM), or an electrically erasable programmable read-only memory (EEPROM); a magnetic disk; a flexible disk; an optical disk; a compact disc; a MiniDisc; a digital versatile disc (DVD); or the like.

The control unit 104 and the modulation/demodulation unit 103 of the base station 100 are implemented by the processor 801 and a program stored in the memory 802; specifically, are implemented by the processor 801 reading from the memory 802, and executing, a program for operating the control unit 104 and the modulation/demodulation unit 103.

The transceiver unit 102 of the base station 100 is implemented by the transmitter 803 and the receiver 804. That is, a transmission process in the transceiver unit 102 is performed in the transmitter 803, while a reception process in the transceiver unit 102 is performed in the receiver 804. The beam antenna control unit 105 of the base station 100 is implemented by the antenna unit 805.

The control unit 201 and the modulation/demodulation unit 202 of the terminal device 200 are implemented by the processor 801 and a program stored in the memory 802; specifically, are implemented by the processor 801 reading from the memory 802, and executing, a program for operating the control unit 201 and the modulation/demodulation unit 202.

The transceiver unit 203 of the terminal device 200 is implemented by the transmitter 803 and the receiver 804. That is, a transmission process in the transceiver unit 203 is performed in the transmitter 803, while a reception process in the transceiver unit 203 is performed in the receiver 804. The level measurement unit 205 of the terminal device 200 is implemented by the receiver 804. In addition, the antenna 204 of the terminal device 200 is implemented by the antenna unit 805.

The processing unit 502, the determination unit 504, and the data collection unit 503 of the control apparatus 308 are implemented by the processor 901 and a program stored in the memory 902; specifically, are implemented by the processor 901 reading from the memory 902, and executing, a program for operating the processing unit 502, the determination unit 504, and the data collection unit 503.

Figure 10:
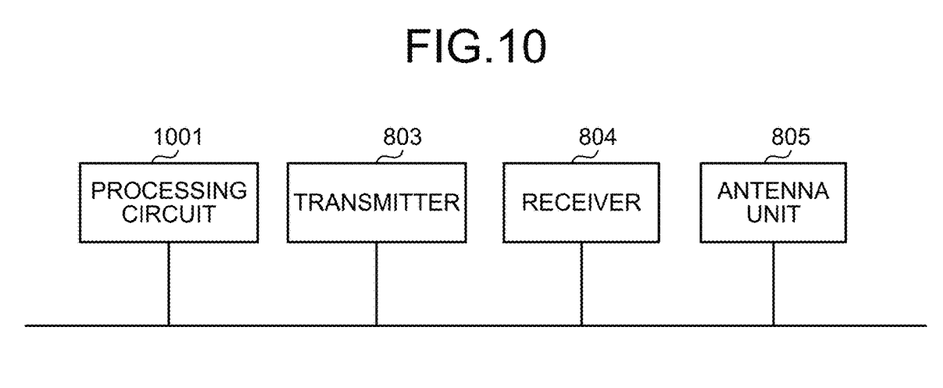
FIG. 10 is a diagram illustrating a hardware configuration in a case in which the base station 100 and the terminal device 200 according to the first embodiment are implemented in dedicated hardware.

Note that the control unit 104 and the modulation/demodulation unit 103 of the base station 100, and the control unit 201 and the modulation/demodulation unit 202 of the terminal device 200 may be implemented in dedicated hardware, or may be implemented partly in dedicated hardware with the remainder implemented in software, firmware, or a combination of software and firmware. When these components are implemented in dedicated hardware, the hardware configuration of each of the base station 100 and the terminal device 200 is, for example, as illustrated in FIG. 10. That is, the control unit 104 and the modulation/demodulation unit 103 of the base station 100, and the control unit 201 and the modulation/demodulation unit 202 of the terminal device 200 are implemented by a processing circuit 1001. The processing circuit 1001 is, for example, a single circuit, a complex circuit, a programmed processor, a parallel programmed processor, an application specific integrated circuit (ASIC), a field programmable gate array (FPGA), or a combination thereof.

The configurations described in the foregoing embodiment are merely examples of aspects of the present invention. These configurations may be combined with other known technologies, and moreover, a part of such configurations may be omitted and/or modified without departing from the spirit of the present invention.

Note that although a base station of the conventional technology performs coverage optimization of a cell of the base station prior to the beginning of operation, a base station of the present embodiment is capable of performing coverage optimization following a change in the wireless environment even after the beginning of operation. This enables the coverage to be adaptively optimized on the basis of operating conditions.

As described above, the control apparatus 308 for wireless communication system according to the present embodiment includes the communication unit 501 that obtains, from the base station 301, which is a first base station, information indicating reception quality, at the terminal device 312 being a terminal device, of a signal transmitted on a directional beam from the base station 301, and the processing unit 502 that determines, on the basis of the information obtained by the communication unit 501, whether to remove a first spot, which is an area irradiated with a directional beam from the base station 301. If the processing unit 502 determines that the first spot is to be removed, the communication unit 501 sends an instruction to remove the first spot to the base station 301 or to the master base station 304 of the base station 301. This configuration enables the control apparatus 308 to determine whether to provide service or not for each directional beam from the base station 301, and thus to perform optimization of the coverage of a base station having an array antenna configuration or other similar antenna configurations.

In addition, in the control apparatus 308 for wireless communication system according to the present embodiment, the communication unit 501 obtains information indicating reception quality, at the terminal device 312, of a signal transmitted on a directional beam from the base station 315, which is a second base station, and the processing unit 502 determines an overlap condition between the first spot and a second spot, which is an area irradiated with a directional beam from the base station 315, on the basis of the information obtained by the communication unit 501, and if the determination indicates that an overlap exists, the processing unit 502 determines that the first spot or the second spot is to be removed; and if the processing unit 502 determines that the second spot is to be removed, the communication unit 501 sends an instruction to remove the second spot to the base station 315 or to the master base station 317 of the base station 315. This configuration enables an optimum beam radiation location to be found between base stations, and thus inter-beam interference on a terminal device to be reduced in a communication system consisting of two or more base station facilities.

In addition, in the control apparatus 308 for wireless communication system according to the present embodiment, the communication unit 501 obtains the information indicating reception quality, at the terminal device 312, of a signal transmitted on a directional beam from the base station 315 from the base station 301. This configuration enables the control apparatus 308 to obtain reception quality information on different base stations at the terminal device 312 from one base station 301, thereby allowing the amount of control to be reduced as compared to obtaining reception quality information on multiple base stations from each of these base stations individually.

In addition, the control apparatus 308 for wireless communication system according to the present embodiment includes the data collection unit 503 that accumulates the information obtained by the communication unit 501. The overlap condition between the first spot and the second spot determined by the processing unit 502 is determined on the basis of the information accumulated in the data collection unit 503. This configuration enables information accumulated in the data collection unit 503 to be used, thereby enabling reliability of determination of the overlap condition between the first spot and the second spot to be improved as compared to when the accumulated information is not used.

In addition, in the control apparatus 308 for wireless communication system according to the present embodiment, the communication unit 501 obtains a load of the base station 301, which is the first base station, and a load of the base station 315, which is the second base station; the number of the base stations 301 managed by the master base station 304 to which the base station 301 belongs and the number of base stations managed by the master base station 317 to which the base station 315 belongs; or the number of terminal devices managed by the master base station 304 to which the base station 301 belongs and the number of terminal devices managed by the master base station 317 to which the base station 315 belongs; and the processing unit 502 determines which of the first spot and the second spot to be removed on the basis of the information obtained by the communication unit 501. This configuration enables more detailed information on the base station 301 and on the base station 315 to be used, thereby enabling a determination of which of the first spot and the second spot is to be removed to be made more accurately.

In addition, the terminal device 312 according to the present embodiment reports, to the base station 301, information indicating reception quality, at the terminal device 312, of a signal transmitted on a directional beam from the base station 301, which is the first base station, and information indicating reception quality, at the terminal device 312, of a signal transmitted on a directional beam from the base station 315, which is the second base station. This configuration enables a report necessary for finding an optimum beam radiation location between base stations to be provided to the base station 301 in a communication system consisting of two or more base station facilities, and thus providing of suitable control on the network side of the wireless communication system can reduce inter-beam interference on the terminal device 312.

In addition, in the terminal device 312 according to the present embodiment, the reception quality is reception quality, at the terminal device 312, of signals respectively transmitted on a plurality of directional beams generated by the base station 301, which is the first base station. This configuration enables a directional beam that can ensure suitable coverage to be determined among multiple directional beams on the network side of the wireless communication system, thereby enabling the base station 301 to provide suitable reception quality to the terminal device 312.

In addition, the wireless base station 301 according to the present embodiment receives, from the terminal device 312 residing within a service area of the wireless base station 301, information indicating reception quality, at the terminal device 312, of signals respectively transmitted on a plurality of directional beams formed of a directional beam from the wireless base station 301, and identifies, on the basis of the information received, a spot in which the terminal device resides among a plurality of spots that are areas respectively irradiated with the plurality of directional beams. This configuration enables the base station 301 to use a directional beam suitable for the terminal device 312, and thus to provide suitable reception quality.

REFERENCE SIGNS LIST 100 base station; 101 antenna unit; 102 transceiver unit; 103 modulation/demodulation unit; 104 control unit; 105 beam control unit; 106, 107 antenna; 200 terminal device; 201 control unit; 202 modulation/demodulation unit; 203 transceiver unit; 204 antenna; 205 level measurement unit; 301, 302, 303, 315 base station; 304, 317 master base station; 305, 306, 314 router-or-relay device; 307, 309, 316 optical fiber cable, metal wire, wireless communication, or the like; 308 control apparatus; 310 beam; 311, 321 service area; 312 terminal device; 313 spot; 318, 323 spot; 319 terminal device; 320 spot; 322 beam; 501 communication unit; 502 processing unit; 503 data collection unit; 504 determination unit; 601 location information; 602 measurement time; 603 to 606 feedback information; 801 processor; 802 memory; 803 transmitter; 804 receiver; 805 antenna unit; 901 processor; 902 memory; 903 transmitter; 904 receiver; 1001 processing circuit.

The invention claimed is:

1. A control apparatus for wireless communication system comprising:
a communicator to obtain, via a network, first reception sensitivity level information indicating a reception sensitivity level, at a terminal device, of a signal transmitted on a directional beam from a first base station over the network for each of a plurality of directional beams formed by the first base station, and second reception sensitivity level information indicating a reception sensitivity level, at the terminal device, of a signal transmitted on a directional beam from a second base station over the network for each of a plurality of directional beams formed by the second base station; and a processor to determine, if a difference between the first reception sensitivity level and the second reception sensitivity level is less than or equal a predetermined value, that a first spot, which is an area irradiated with one of the plurality of directional beams from the first base station, and a second spot, which is an area irradiated with one of the plurality of directional beams from the second base station, overlap each other.

2. The control apparatus according to claim 1, wherein the communicator obtains the first reception sensitivity level information from the first base station.

3. The control apparatus according to claim 2, wherein the communicator obtains the second reception sensitivity level information from the first base station.

4. The control apparatus according to claim 1, wherein if the processor determines that the first spot and the second spot overlap each other, the processor determines that the first spot or the second spot is to be removed.

5. The control apparatus according to claim 2, wherein if the processor determines that the first spot and the second spot overlap each other, the processor determines that the first spot or the second spot is to be removed.

6. The control apparatus according to claim 3, wherein if the processor determines that the first spot and the second spot overlap each other, the processor determines that the first spot or the second spot is to be removed.

7. The control apparatus according to claim 4, wherein if the processor determines that the first spot is to be removed, the communicator sends an instruction to remove the first spot to the first base station or to a master base station of the first base station, and if the processor determines that the second spot is to be removed, the communicator sends an instruction to remove the second spot to the second base station or to a master base station of the second base station.

8. The control apparatus according to claim 5, wherein if the processor determines that the first spot is to be removed, the communicator sends an instruction to remove the first spot to the first base station or to a master base station of the first base station, and if the processor determines that the second spot is to be removed, the communicator sends an instruction to remove the second spot to the second base station or to a master base station of the second base station.

9. The control apparatus according to claim 6, wherein if the processor determines that the first spot is to be removed, the communicator sends an instruction to remove the first spot to the first base station or to a master base station of the first base station, and if the processor determines that the second spot is to be removed, the communicator sends an instruction to remove the second spot to the second base station or to a master base station of the second base station.

10. The control apparatus according to claim 1, wherein
the communicator obtains a load of the first base station and a load of the second base station; the number of base stations managed by the master base station to which the first base station belongs and the number of base stations managed by the master base station to which the second base station belongs; or the number of terminal devices managed by the master base station to which the first base station belongs and the number of terminal devices managed by the master base station to which the second base station belongs, and the processor determines which of the first spot and the second spot is to be removed on a basis of the information obtained by the communicator.

11. The control apparatus according to claim 2, wherein
the communicator obtains a load of the first base station and a load of the second base station; the number of base stations managed by the master base station to which the first base station belongs and the number of base stations managed by the master base station to which the second base station belongs; or the number of terminal devices managed by the master base station to which the first base station belongs and the number of terminal devices managed by the master base station to which the second base station belongs, and the processor determines which of the first spot and the second spot is to be removed on a basis of the information obtained by the communicator.

12. The control apparatus according to claim 3, wherein
the communicator obtains a load of the first base station and a load of the second base station; the number of base stations managed by the master base station to which the first base station belongs and the number of base stations managed by the master base station to which the second base station belongs; or the number of terminal devices managed by the master base station to which the first base station belongs and the number of terminal devices managed by the master base station to which the second base station belongs, and the processor determines which of the first spot and the second spot is to be removed on a basis of the information obtained by the communicator.

13. The control apparatus according to claim 4, wherein
the communicator obtains a load of the first base station and a load of the second base station; the number of base stations managed by the master base station to which the first base station belongs and the number of base stations managed by the master base station to which the second base station belongs; or the number of terminal devices managed by the master base station to which the first base station belongs and the number of terminal devices managed by the master base station to which the second base station belongs, and the processor determines which of the first spot and the second spot is to be removed on a basis of the information obtained by the communicator.

14. The control apparatus according to claim 5, wherein
the communicator obtains a load of the first base station and a load of the second base station; the number of base stations managed by the master base station to which the first base station belongs and the number of base stations managed by the master base station to which the second base station belongs; or the number of terminal devices managed by the master base station to which the first base station belongs and the number of terminal devices managed by the master base station to which the second base station belongs, and the processor determines which of the first spot and the second spot is to be removed on a basis of the information obtained by the communicator.

15. The control apparatus according to claim 6, wherein
the communicator obtains a load of the first base station and a load of the second base station; the number of base stations managed by the master base station to which the first base station belongs and the number of base stations managed by the master base station to which the second base station belongs; or the number of terminal devices managed by the master base station to which the first base station belongs and the number of terminal devices managed by the master base station to which the second base station belongs, and the processor determines which of the first spot and the second spot is to be removed ort a basis of the information obtained by the communicator.

16. The control apparatus according to claim 7, wherein the communicator obtains a load of the first base station and a load of the second base station; the number of base stations managed by the master base station to which the first base station belongs and the number of base stations managed by the master base station to which the second base station belongs; or the number of terminal devices managed by the master base station to which the first base station belongs and the number of terminal devices managed by the master base station to which the second base station belongs, and the processor determines which of the first spot and the second spot is to be removed on a basis of the information obtained by the communicator.

17. The control apparatus according to claim 8, wherein the communicator obtains a load of the first base station and a load of the second base station; the number of base stations managed by the master base station to which the first base station belongs and the number of base stations managed by the master base station to which the second base station belongs; or the number of terminal devices managed by the master base station to which the first base station belongs and the number of terminal devices managed by the master base station to which the second base station belongs, and the processor determines which of the first spot and the second spot is to be removed on a basis of the information obtained by the communicator.

18. The control apparatus according to claim 9, wherein the communicator obtains a load of the first base station and a load of the second base station; the number of base stations managed by the master base station to which the first base station belongs and the number of base stations managed by the master base station to which the second base station belongs; or the number of terminal devices managed by the master base station to which the first base station belongs and the number of terminal devices managed by the master base station to which the second base station belongs, and the processor determines which of the first spot and the second spot is to be removed on a basis of the information obtained by the communicator.

* * * * *